(No Model.)

J. SMITH & J. P. RHODES.
DUMPING CAR.

No. 275,532. Patented Apr. 10, 1883.

WITNESSES:
Chas. Niota
C. Sedgwick

INVENTOR:
J. Smith
J. P. Rhodes
BY Munn & Co.
ATTORNEYS.

UNITED STATES PATENT OFFICE.

JOHN SMITH AND JOHN P. RHODES, OF ROCKVILLE CENTRE, NEW YORK.

DUMPING-CAR.

SPECIFICATION forming part of Letters Patent No. 275,532, dated April 10, 1883.

Application filed September 21, 1882. (No model.)

*To all whom it may concern:*

Be it known that we, JOHN SMITH and JOHN P. RHODES, of Rockville Centre, in the county of Queens and State of New York, have invented a new and useful Improvement in Railroad Dumping-Flats, of which the following is a full, clear, and exact description.

Reference is to be had to the accompanying drawings, forming a part of this specification, in which similar letters of reference indicate corresponding parts in all the figures.

Figure 1:
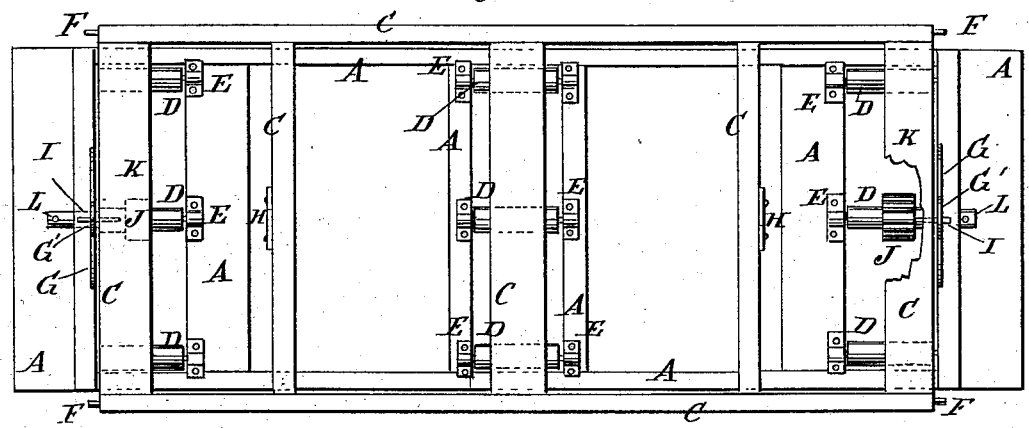
Figure 2:
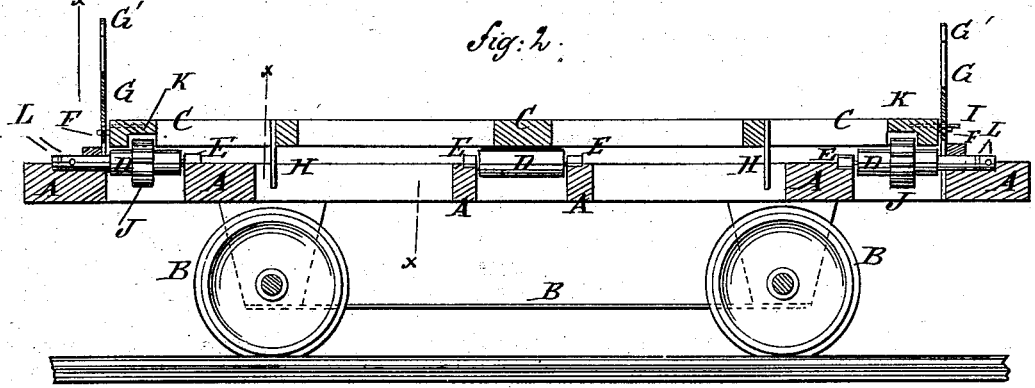
Figure 3:
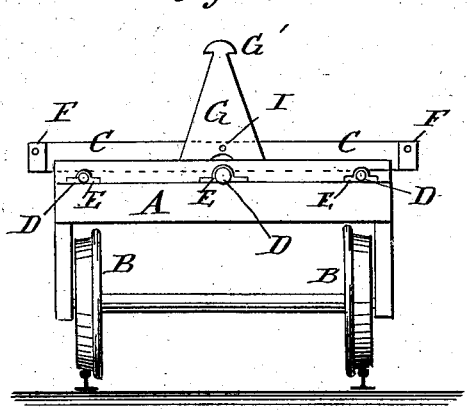
Figure 4:
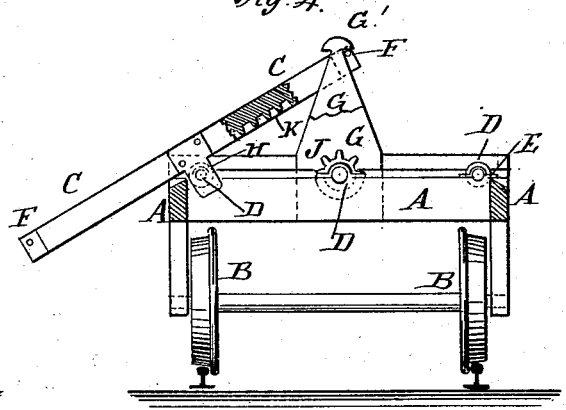

Figure 1 is a plan view of our improvement, the car-floor being removed and part of the movable frame being broken away. Fig. 2 is a sectional side elevation of the same. Fig. 3 is an end elevation of the same. Fig. 4 is a sectional end elevation of the same, taken through the broken line *x x x*, Fig. 2, and part being broken away.

The object of this invention is to facilitate the unloading of gravel, coal, and similar substances from railroad-flats.

The invention consists in a railroad dumping-flat constructed with a movable frame mounted upon rollers journaled upon an ordinary car-frame, the said movable frame being provided with stops to limit its movement, whereby the said frame can be readily moved to one side or the other and tilted to dump the load at the side of the car. To the movable frame are attached rack-bars, which engage with gear-wheels journaled to the car-frame, so that the said frame can be moved by turning the said gear-wheels, as will be hereinafter fully described.

A represents the frame of an ordinary railroad-flat, which is mounted upon a truck, B, in the ordinary manner.

C is the top frame of the car, which rests upon rollers D, placed longitudinally with the car and journaled in bearings E, attached to the frame A. With this construction the frame C can be easily moved toward either side of the car for about half the width of the frame, and can then be easily tilted to discharge the entire load at once at the side of the car. As the frame C is moved laterally it is stopped at the proper point by the stop-pins F, attached to the corners of the said frame, coming in contact with the stop-standards G, attached to cross-bars of the frame A, and by the stops H, attached to the cross-bars of the frame C, coming in contact with the side bars of the frame A. The side edges of the standards G are inclined upward and inward, so that the pins F will be out of contact with the said edges while the frame C is being tilted. Upon the upper ends of the standards G are formed cross-heads G', against which the stop-pins F strike when the frame C has reached the proper inclination to discharge the load, so that the said frame cannot be tipped too far. When the load has been discharged the frame C is swung down into a horizontal position and drawn back into its former position, where it is secured in place by pins I, passing through the standards G and into the end cross-bars of the said frame C, or by spring-catches or other suitable means.

If desired, gear-wheels J can be attached to or formed upon the central rollers D at the ends of the frame A, the teeth of which mesh into the teeth of rack-bars K, formed upon or attached to the end parts of the frame C. One of the journals of the rollers D that carry the gear-wheels J projects and is provided with a series of holes, L, to receive a lever for turning the said gear-wheels, or may be provided with hand-wheels or other suitable means for turning it, so that the frame C can be moved out and in readily. The teeth of the gear-wheels J and rack-bars K are so formed that the weight of the frame C and its load will rest upon the rollers D, and not upon the gear-wheels J. With this construction, when the car is to be unloaded the loaded frame C is run out at one side until about upon a balance, and is tilted to discharge the load. The frame C is then turned down into a horizontal position and run back to and secured in its place, ready to receive another load.

Having thus described our invention, we claim as new and desire to secure by Letters Patent—

In a railroad dumping-flat, the combination, with the frame A, having the rolls D, one of which has a pinion, J, and its axis provided with sockets L to receive a lever, and the upward and inward inclined upright or stop G, having an aperture, I, and cross-head G', of the movable frame C, having a rack, K, and stops H on its under side, and the stops or projections F at its ends adapted to move up the upright or stop G, as and for the purpose set forth.

JOHN SMITH.
JOHN P. RHODES.

Witnesses:
ARTHUR M. DE MOTT,
SAMUEL DE MOTT.